May 24, 1955
J. MACEWKA
2,709,212
WELDING TIP HOLDER
Filed June 2, 1953
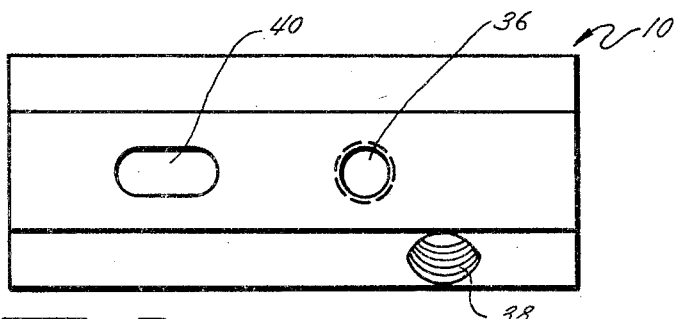
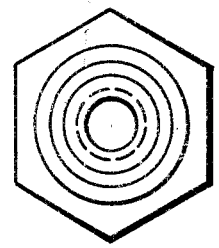
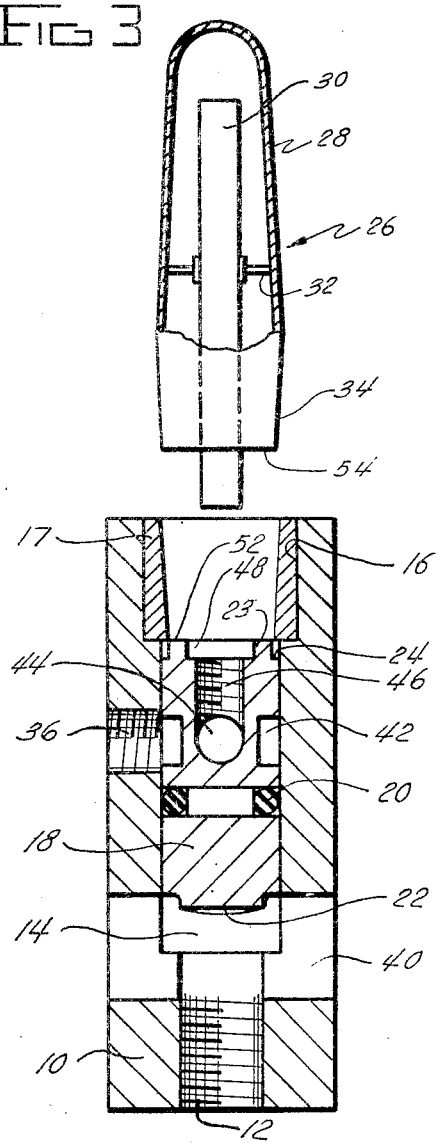
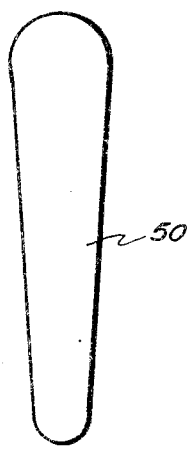
INVENTOR
JOHN MACEWKA
SMITH & OLSEN
ATTORNEYS United States Patent Office 2,709,212
Patented May 24, 1955

2,709,212

WELDING TIP HOLDER

John Macewka, Detroit, Mich.

Application June 2, 1953, Serial No. 359,023

4 Claims. (Cl. 219—4)

The present invention relates to a welding electrode holder, and more particularly to a welding electrode holder wherein means is provided for quickly and easily removing the welding electrode without damage thereto.

Prior to the present invention it has been conventional practice to remove welding electrodes from electrode holders by using a pipe wrench and twisting the electrode loose. Since welding electrodes are generally formed of copper alloys which are relatively soft, the pipe wrench readily causes damage to the electrodes. Knockout electrode constructions have been proposed in the past to eliminate this undesirable condition but none have proven practical so as to warrant adoption in commercial practice.

Therefore, it is a principal object of the present invention to provide a welding electrode holder which is simple and efficient in construction and which will permit removal of an electrode rapidly and easily without damage thereto.

It is another object of the present invention to provide a welding electrode holder which includes a tapered electrode seat which can be removed if necessary and which is so constructed and arranged to permit removal of an electrode from the seat by a simple knockout blow directed laterally through the electrode holder.

It is a further object of the present invention to provide a welding electrode holder which is constructed and arranged to permit rapid and easy removal of the electrode holder while being adapted to operate with a conventional liquid cooled electrode.

Other objects of this invention will appear in the following description and appended claims, reference being had to the accompanying drawings forming a part of this specification wherein like reference characters designate corresponding parts in the several views.

In the drawings:

Figure 1 is a side view of a welding electrode holder constructed according to the present invention, Fig. 2 is an end view of the welding electrode holder shown in Fig. 1, Fig. 3 is a sectional elevation of the welding electrode holder shown in Fig. 1, a welding electrode being shown positioned above the holder with portions broken away for clarity, and Fig. 4 is an elevation of a drift pin which can be used with the welding electrode holder of the present invention to remove the welding electrode.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings, the body portion of the welding electrode holder is designated generally at 10. The body portion 10 has a central bore extending longitudinally therethrough. The bore includes a threaded portion 12, an enlarged spool chamber 14, and a cylindrical bearing seat 16. The threaded opening 12 is adapted for connection to the actuating rod of a welding mechanism, and the bearing seat 16 is adapted to hold the bearing 17.

Disposed within the spool chamber 14 is a movable knockout spool 18 which is adapted to move up and down in the spool chamber 14 as shown in Fig. 3. The spool 18 includes the O-ring seal 20 which is formed of neoprene or other suitable material to seal against the cooling fluid which is used to cool the welding electrode. The spool 18 is provided with a boss 22 at one end which is used in moving the spool 18 within the spool chamber 14 as will be explained later. The other end of the spool is provided with a reduced portion resulting in the knockout surface 23 and the annular shoulder 24.

Cooling fluid such as water is circulated through the welding electrode to cool the same and to prevent the electrode from being overheated by the high electrical energy which is applied thereto in the welding operation. A conventional electrode is shown at 26. This electrode includes the shell 28 which has a pipe 30 disposed therein in spaced relationship by the brackets 32. The base of the electrode is provided with a tapered portion 34.

The body portion 10 of the electrode holder is provided with an inlet 36, an outlet 38, and a transverse opening 40. The knockout spool 18 is provided with an annular groove 42, a transverse hole 44 communicating with said groove 42, and a longitudinal hole 46 in communication with said transverse hole 44. When the device is in operation, an inlet hose from a source of coolant such as water is screwed into the inlet 36. The water flows through the inlet 36, around the annular groove 42 in the spool 18, through the transverse hole 44 and into the longitudinal hole 46. The electrode 26 will be inserted into the bearing 17 in the operative position, and the pipe 30 will extend into the longitudinal hole 46 in the spool. Thus, the water will travel from the longitudinal hole 46 through the pipe 30 and back down outside the pipe 30 and between the pipe 30 and the shell 28 of the electrode. The water will then pass through the opening 48 and out the outlet 38 through an outlet hose (not shown) which is in screw threaded engagement with the outlet.

The provision of the bearing 17, which is cylindrical on the exterior and tapered on the interior, permits a tight engagement at all times between the electrode holder and the electrode. If the fit becomes loose, the bearing may be removed and a new bearing installed.

When the device is not operating and it is desired to remove the electrode, a tapered object such as the drift pin 50 is inserted with the narrow end through the transverse opening 40. As the taper increases, the boss 22 on the knockout spool 18 will be engaged by the drift pin 50. At this point, a hammer or the like may be used to tap the wide end of the drift pin. As the enlarged portion of the drift pin is driven into the opening 40 the spool 18 is moved upward by the engagement of the drift pin with the boss 22. The end 52 of the spool is moved against the end 54 of the electrode 26 and the tapered portion 34 of the electrode is loosened from its engagement with the bearing 17. The electrode is then easily removed from the electrode holder. The O-ring seal 20 prevents leakage of any cooling fluid both in the static position and when the spool 18 is moved. The shoulder 24 on the spool 18 engages the bearing 17 and prevents the spool 18 from moving too far upward.

The electrode holder of the present invention has proven efficient in operation and is simple and readily adapted to economical production.

Having thus described my invention, I claim:

1. A welding electrode holder comprising a body portion having a central bore extending longitudinally therethrough, a bearing for holding a welding electrode in position seated adjacent one end of said body portion in said bore, a longitudinally movable spool disposed adjacent said bearing in said bore and having a shoulder thereon which overlies said bearing, a portion of said spool extending into a transverse opening extending through said body portion so that movement of a tapered object through said transverse opening will move said spool away from said opening and extend a portion thereof within the confines of said bearing to loosen an electrode disposed therein.

2. A welding electrode holder comprising a body portion having a central bore extending longitudinally therethrough, a bearing for holding a welding electrode in position seated adjacent one end of said body portion in said bore, a longitudinally movable spool disposed adjacent said bearing in said bore, a reduced portion on said spool which provides a knockout surface adjacent said bearing and a shoulder overlying said bearing, all portions of said spool being out of the bearing and electrode in the normal position, a portion of said spool extending into a transverse opening extending through said body portion so that movement of a tapered object through said transverse opening will move said spool away from said opening and extend said knockout surface within said bearing to loosen an electrode disposed therein.

3. A welding electrode assembly comprising a holder having a longitudinal bore extending longitudinally therethrough, a bearing having a tapered interior seated adjacent one end of said holder in said bore, a detachable welding electrode seated in said bearing, said electrode being hollow and having a pipe extending therefrom, a longitudinally movable spool disposed adjacent said bearing in said bore, a reduced portion on said spool which provides a knockout surface in contact with the end of said electrode and a shoulder overlying said bearing, a portion of said spool extending into a transverse opening extending through said holder so that movement of a tapered object through said transverse opening will move said spool away from said opening and force the knockout surface on said spool against said electrode to loosen the electrode from its engagement with said bearing, said spool having an annular peripheral groove which communicates with an inlet in said holder to take in a liquid coolant and also communicates with a transverse opening which meets a longitudinal hole in the spool, the pipe from said electrode extending into the lonigtudinal hole, said spool also having an opening adjacent said bearing which communicates with an outlet in said holder to expel coolant circulated through said holder and electrode, and a seal on said spool between the inlet and the transverse opening in said holder.

4. A welding electrode holder comprising a body portion having a central bore extending longitudinally therethrough, a bearing for holding a welding electrode in position seated adjacent one end of said body portion in said bore, a longitudinally movable spool disposed adjacent said bearing in said bore and having a shoulder thereon which overlies said bearing, a portion of said spool extending into a transverse opening extending through said body portion so that movement of a tapered object through said transverse opening will move said spool away from said opening and extend a portion thereof within the confines of said bearing to loosen an electrode disposed therein, said spool having an annular peripheral groove which communicates with an inlet in said body portion adapted to take in a liquid coolant and also communicates with a transverse opening which meets a longitudinal hole in the spool, the longitudinal hole being adapted to seat the coolant pipe of a welding electrode, said spool also having an opening adjacent said bearing which communicates with an outlet in said body portion to expel coolant which is circulated through said holder and electrode, and a seal on said spool between the inlet and the transverse opening in said body portion.

References Cited in the file of this patent

UNITED STATES PATENTS 2,215,289   Hensel et al. _____ Sept. 17, 1940